United States Patent
Asano (10) Patent No.: US 6,585,867 B1
(45) Date of Patent: Jul. 1, 2003

(54) PRODUCTION SYSTEM OF ELECTROLYZED WATER

(75) Inventor: Katsuhiro Asano, Shimane-ken (JP)

(73) Assignee: Hoshizaki Denki Kabushiki Kaisha, Toyoake (JP)

( * ) Notice: Subject to any disclaimer, the term of this patent is extended or adjusted under 35 U.S.C. 154(b) by 66 days.

(21) Appl. No.: 09/665,043

(22) Filed: Sep. 19, 2000

(51) Int. Cl.⁷ ............................ B23H 3/02; C25B 15/00; C25B 9/00; C25B 9/04; C25D 17/00

(52) U.S. Cl. ..................... 204/228.3; 204/228.1; 204/230.5; 204/660; 204/661

(58) Field of Search .................. 205/628, 633, 205/637; 204/228.1, 228.3, 230.5, 229.6, 660, 661

(56) References Cited

U.S. PATENT DOCUMENTS

| | | | | |
|---|---|---|---|---|
| 5,234,563 A | * | 8/1993 | Arai et al. | 204/228.3 |
| 5,985,108 A | * | 11/1999 | Arai | 204/228.1 |
| 6,337,002 B1 | * | 1/2002 | Kashimoto | 204/228.6 |
| 2002/0070107 A1 | * | 6/2002 | Usinowicz et al. | 204/228.3 |

FOREIGN PATENT DOCUMENTS

JP 07251177 A 10/1995

* cited by examiner

*Primary Examiner*—Nam Nguyen
*Assistant Examiner*—Wesley A. Nicolas
(74) *Attorney, Agent, or Firm*—Arent, Fox, Kintner, Plotkin & Kahn, PLLC (57) ABSTRACT

In a production system of electrolyzed water A, alkaline water and acid water produced in a pair of electrode chambers 12, 23 of an electrolyzer 10 are discharged from discharge conduits 41, 42 through a flow passage changeover valve 50. The discharge conduits 41, 42 are provided at their outlet portions with manually operated faucets 43, 44 and 45, 46. Water flow sensors 81, 82 ate provided to be turned on and off in accordance with the flow of water supplied from a water supply conduit 24. In the production system of electrolyzed water, electrodes 14, 15 of the electrolyzer 10 are applied with DC voltages when the water flow sensors are continuously maintained at their on-positions for more than a predetermined time, and the supply of DC voltages to the electrodes is cut off when the water flow sensors 81, 82 are continuously maintained in their off-posiitons for more than the predetermined time

4 Claims, 6 Drawing Sheets

PRODUCTION SYSTEM OF ELECTROLYZED WATER

BACKGROUND OF THE INVENTION

1. Field of the Invention

The present invention relates to a production system of electrolyzed water which includes an electrolyzer provided therein with a pair of electrodes for continuously electrolyzing water to be treated and discharging electrolyzed water.

2. Discussion of the Prior Art

Disclosed in Japanese Patent Laid-open Publication No. 7-251177 is a production system of electrolyzed water. The system includes an electrolyzer provided therein with a pair of electrodes, a water supply conduits connected to an inlet portion of the electrolyzer for supplying water into the electrolyzer from a water supply source, a water flow sensor provided to detect the flow of water supplied into the electrolyzer, and a discharge conduit. The discharge conduit is connected to an outlet port of the electrolyzer and provided with a faucet at its outlet portion, wherein the water from the water supply source flows into the discharge conduit through the electrolyzer when the faucet is opened. In the production system of electrolyzed water, the electrodes of the electrolyzer are applied with DC voltages to electrolyze the supplied water when the flow of water is detected by the water flow sensor[, and the]. The supply of DC voltages to the electrodes is cut off when the flow of water may not be detected by the water flow sensor.

In the production system of electrolyzed water, however, the flow of water is detected by the water flow sensor for a moment when the faucet is erroneously closed by a user immediately after it has been opened or in the occurrence of water hammer. As a result, the electrodes are applied with DC voltages for a short time. Contrarily, when the faucet is fully closed and opened by the user after it has been operated to reduce or throttle the discharge amount of electrolyzed water, the flow of water may not be detected by the water flow sensor for a moment. As a result, the supply of DC voltages to the electrodes is resumed immediately after cut off for a short time. Such instantaneous supply or cut-off of the DC voltages shortens the life span of the electrodes and increases an amount of scale adhered to the electrodes under lack of the flow of water, resulting in deterioration of the electrolysis performance of the production system.

SUMMARY OF THE INVENTION

It is, therefore, a primary object of the present invention to provide a production system of electrolyzed water in which the supply of DC voltages to the electrodes is maintained or cut off irrespectively of detection of the flow of water for a short time to avoid the problems discussed above.

According to the present invention, the object is accomplished by providing a production system of electrolyzed water. The system includes an electrolyzer provided therein with a pair of electrodes, water supply means for supplying water to be treated into the electrolyzer, and detection means for detecting the flow of water supplied into the electrolyzer. The electrodes of the electrolyzer are applied with DC voltages to electrolyze the water when the flow of water is detected by the detection means[, wherein the]. The production system of electrolyzer comprises control means for applying the DC voltages to the electrodes of the electrolyzer only when the flow of water is continuously detected by the detection means for more than a predetermined time.

In the production system of electrolyzed water, the electrodes of the electrolyzer are applied with the DC voltages under the control means only when the flow of water is continuously detected by the detection means for more than the predetermined time. Accordingly, the electrodes of the electrolyzer may not be applied with the DC voltages when the flow of water is detected by the detection means for a moment or in the occurrence of water hammer. This is useful to prevent deterioration of the life span of the electrodes and to restrain adherence of scale to the electrodes.

In a practical embodiment, there is provided a production system of electrolyzed water which includes an electrolyzer provided therein with a pair of electrodes, a water supply conduit connected to the electrolyzer for continuously supplying water to be treated into the electrolyzer from an external water supply source, a discharge conduit connected to the electrolyzer for discharging electrolyzed water produced in the electrolyzer to the exterior, a manually operated valve provided on the water supply conduit or the discharge conduit for adjusting an amount of the water flowing from the water supply conduit into the discharge conduit through the electrolyzer, detection means for detecting the flow of water, and control means for applying DC voltages to the electrodes of the electrolyzer. The electrodes of the electrolyzer are applied with the DC voltages for electrolysis of the water under control of the control means when the flow of water is detected by the detection means[, wherein the]. The control means comprises means for applying the DC voltages to the electrodes of the electrolyzer only when the flow of water is continuously detected by the detection means for more than a predetermined time.

In another practical embodiment of the present invention, there is provided a production system of electrolyzed water which includes an electrolyzer provided therein with a pair of electrodes, water supply means for supplying water to be treated into the electrolyzer, and detection means for detecting the flow of water supplied into the electrolyzer. The electrodes of the electrolyzer are applied with DC voltages to electrolyze the water when the flow of water is detected by the detection means[, wherein the]. The production system of electrolyzed water comprises control means for cutting off the supply of DC voltages to the electrodes of the electrolyzer when the flow of water is not continuously detected by the detection means for more than a predetermined time.

In a further practical embodiment of the present invention, there is provided a production system of electrolyzed water. The system includes an electrolyzer provided therein with a pair of electrodes, a water supply conduit connected to the electrolyzer for continuously supplying water to be treated into the electrolyzer from an external water supply source, a discharge conduit connected to the electrolyzer for discharging electrolyzed water produced in the electrolyzer to the exterior, and a manually operated valve provided on the water supply conduit or the discharge conduit for adjusting an amount of the water flowing from the water supply conduit into the discharge conduit through the electrolyzer, detection means for detecting the flow of water, and control means for applying DC voltages to the electrodes of the electrolyzer. The electrodes of the electrolyzer are applied with the DC voltages for electrolysis of the water under control of the control means when the flow of water is detected by the detection means. The production system of electrolyzed water comprises means for cutting off the supply of DC voltages to the electrodes of the electrolyzer when the flow of water is not continuously detected by the detection means for more than a predetermined time.

DESCRIPTION OF THE PREFERRED EMBODIMENT

Hereinafter, a preferred embodiment of the present invention will be described with reference to the drawings. A production system of electrolyzed water shown in FIG. 1 includes an electrolyzer 10, a pair of inlet conduits 21, 22, a pair of outlet conduits 31, 32, a pair of discharge conduits 41, 42, a flow passage changeover valve 50, a pair of drain conduits 61, 62, a pair of drain valves 71, 72, and an electric control device 100.

Figure 1:
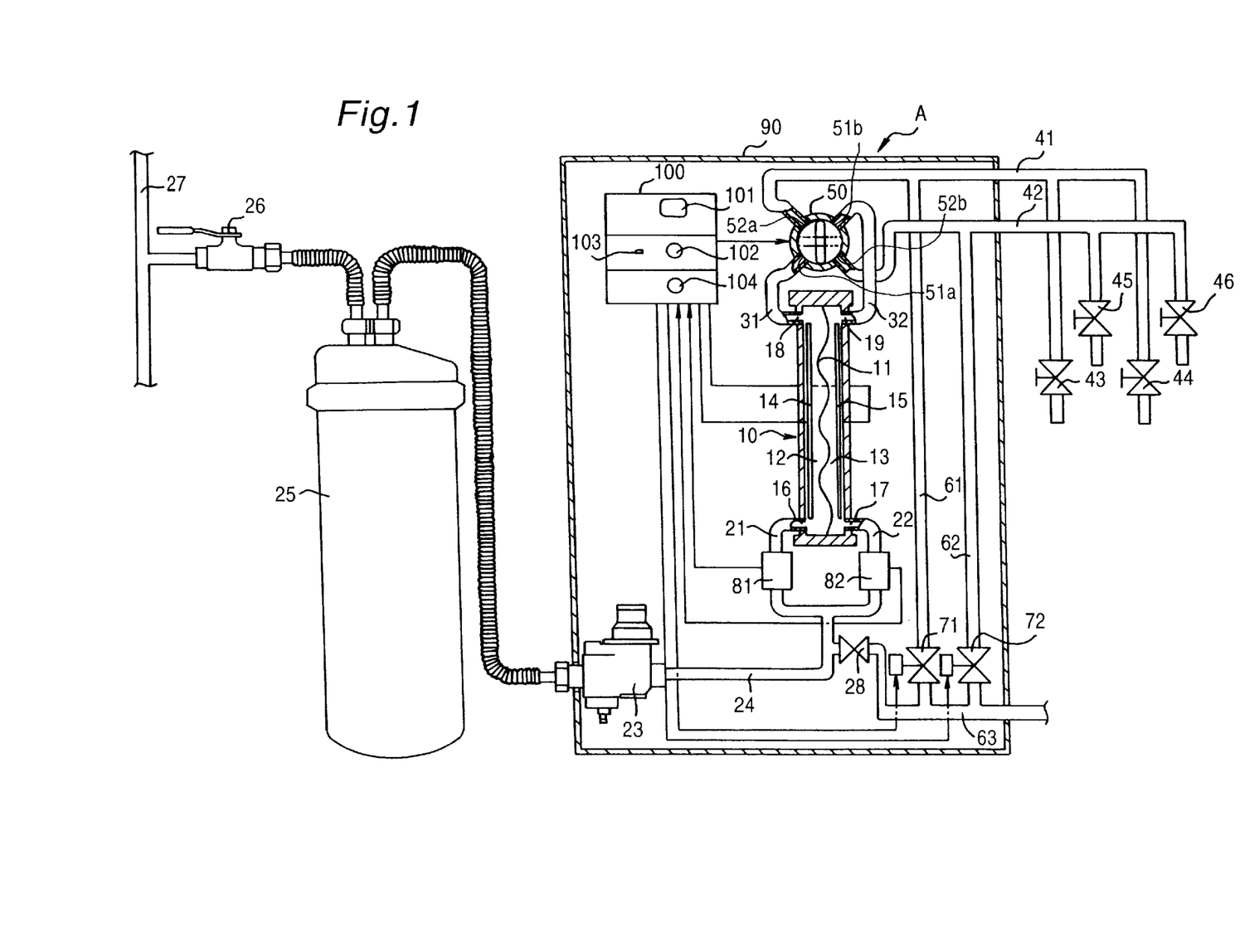
FIG. 1 is a schematic illustration of a production system of electrolyzed water in accordance with the present invention.

The electrolyzer 10 is installed in a housing 90 of the production system of electrolyzed water and is in the form of an electrolyzer of the flow-down type which includes a pair of electrodes 14, 15 provided in a pair of electrode chambers 12, 13 subdivided by a partition membrane 11. The electrodes 14, 15 are connected to the electric control device 100 to be selectively applied with positive and negative DC voltages under control of the control device. The electrolyzer 10 has inlet ports 16, 17 in connection with the inlet conduits 21, 22 and outlet ports 18, 19 in connection with the outlet conduits 31, 32. The inlet conduits 21, 22 are connected to a water supply conduit 24 to supply treatment water (city service water) into the electrode chambers 12, 13 of the electrolyzer 10, and the water supply conduit 24 is connected to a water purifier 25 through a pressure reduction valve 23 placed in the interior of housing 90 and is connected to a main drain conduit 63 through a safety valve 28 in the form of a relief valve. The water purifier 25 is placed in the exterior of housing 90 and is connected to a city service water supply conduit 27 through a main cock 26.

To introduce alkaline water and acid water produced in the electrode chambers 12, 13 into the changeover valve 50, the outlet conduits 31, 32 are provided for connection of the outlet ports 18, 19 of electrolyzer 10 with first and second inlet ports 51a, 51b of the changeover valve 50. The discharge conduits 41, 42 are connected to first and second outlet port 52a, 52b of the changeover valve 50 and extended outwardly from the housing 90 to introduce the alkaline water and acid water from the changeover valve 50 to an appropriate place for use. The discharge conduits 41, 42 are provided at their outlet ends with faucets 43, 44, 45, 46 which are manually operated to open and close the flow passages of discharge conduits 41, 42.

The flow passage changeover valve 50 is switched over to a first position shown by a solid line in FIG. 1 or a second position shown by an imaginary line in FIG. 1 by operation of an electric motor (not shown) under control of the control device 100 to selectively connect the outlet conduits 31, 32 to the discharge conduits 41, 42. Hereinafter, a condition where the changeover valve 50 is retained in its first position to connect the outlet conduits 31, 32 to discharge conduits 41, 42 is referred to a first connecting condition, while a condition where the changeover valve 50 is retained in its second position to connect the outlet conduits 31, 32 to the discharge conduits 42, 41 is referred to a second connecting condition. In the production system, a position sensor (not shown) is provided to detect the position of changeover valve 50. The electric control device 100 is applied with a detection signal from the position sensor. When the faucets 43, 44 and 45, 46 are opened, the water from the city service water supply conduit flows toward the changeover valve 50 and discharge conduits 41, 42 through the water supply conduit 24, inlet conduits 21, 22, electrolyzer 10 and outlet conduits 31, 32. The drain conduits 61, 62 are bifurcated from the discharge conduits 41, 42 respectively between the changeover valve 50 and faucets 43, 44; 45, 46 in the interior of housing 90 and connected to the main drain conduit 63. The drain valves 71, 72 are provided on the drain conduits 61, 62 and each are in the form of a normally closed electromagnetic valve which is activated under control of the electric control device 100.

The water flow sensors 81, 82 are provided on the inlet conduits 21, 22 to be turned on (to issue a high level signal) when the quantity of water flowing through the inlet conduits increases more than a predetermined value and to be turned off (to issue a low level signal) when the quantity of water flowing through the inlet conduits decreases less than the predetermined value. The electric control device 100 is applied with a detection signal from the water flow sensors 81, 82. The electric control device 100 is provided with a main switch 101, a manual changeover switch 102, an indication lamp 103 and an alarm buzzer 104 and includes a microcomputer for executing control programs shown by flow charts in FIGS. 2–4. Hereinafter, an operation mode of the production system of electrolyzed water A conducted under control of the control device will be described.

(1) Flag Indicative of Operation of the Water Flow Sensors:

First of all, flags indicative of each operation of the water flow sensors 81 and 82 will be described with reference to the flow chart of FIG. 4. In this embodiment, flags F1 and F2 are adapted to maintain the DC voltages applied to the electrodes 14, 15 irrespectively of each operation of the water flow sensors 81 and 82.

Figure 4:
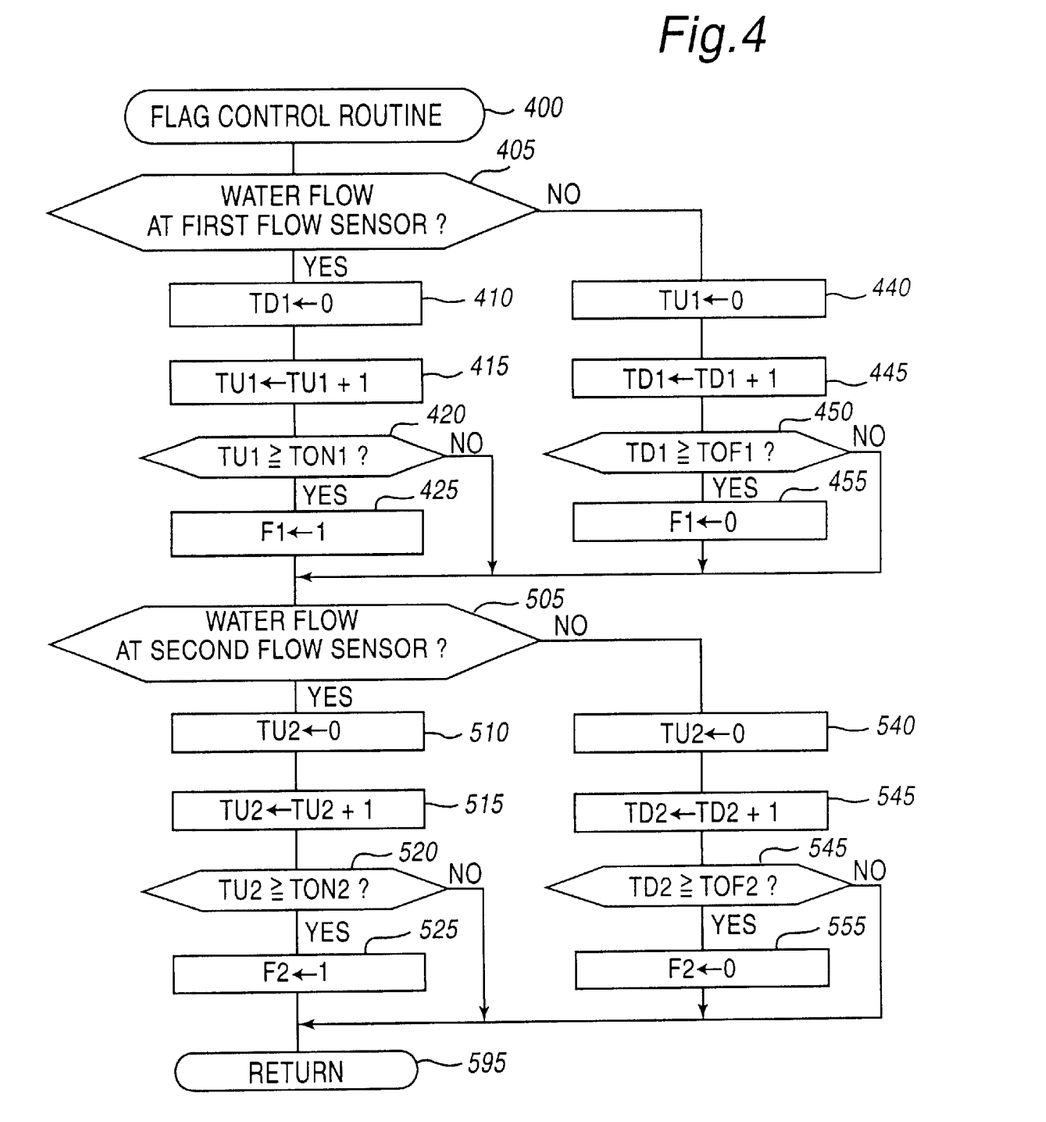
FIG. 4 is a flow chart of a program for detecting recovery of water supply in its suspension.

The microcomputer of control device 100 initiates at step 400 of FIG. 4 to execute the program of a flag control routine in response to an interruption signal applied thereto. At the following step 405, the computer determines whether the first water flow sensor 81 is turned on or not. Immediately after the water flow sensor 81 was turned on, the computer determines a "Yes" answer at step 405 and causes the program to proceed to step 410. Thus, the computer resets a first off-timer TD1 to "0" at step 410 and increases a first on-timer TU1 by "1" at step 415. When the program proceeds to step 420, the computer determines whether the first on-timer TU1 is more than a first standard on-time TON1 or not. If the answer at step 420 is "No", the computer determines at step 505 whether a second water sensor 82 is turned on or not. As the second water flow sensor 82 is turned on at this stage, the computer determines a "Yes" answer at step 505 and resets at step 510 a second off-timer TU2 to "0". At the following step 515, the computer increases a second on-time TD2 by "1" and causes the program to proceed to step 520.

At step 520, the computer determines whether the second on-timer TU2 is more than a second standard on-time TON2 or not. As the water flow sensor 81 is maintained in its on-position, the computer repeats the processing at step 515 during which the second on-time TU2 increases more than the second standard on-time TON2. Thus, the computer determines a "Yes" answer at step 520 and causes the program to proceed to step 525. At step 525, the computer sets the flag F1 as "1" and returns the program step 295 to step 405.

Subsequently, the computer repeats execution of the program of the flag control routine in FIG. 4 in response to the interruption signal. When the first on-timer TU1 increases more than the first standard on-timeTON1, the computer determines a "Yes" answer at step 420 and sets the flag F1 to "1" at step 425. With the foregoing processing, the computer sets the flag F1 to "1" when the first water flow sensor 81 is maintained in its on-position for more than the first standard on-time In a condition where the first water flow sensor 81 is turned off while the second water flow sensor 82 is maintained in its on-position, the computer determines a "No" answer at step 405 and resets the first on-timer TU1 at step 440. At the following step 445, the computer increases the first off-timer TD1 by "1" and causes the program to proceed to step 450. At step 450, the computer determines whether the first off-timer TD1 is more than the first standard off-time TOF1 or not. As the first off-timer TD1 is still less than the first standard off-time TOF1 immediately after the first water flow sensor 81 was turned off, the computer determines a "No" answer at step 450 and causes the program to proceed to step 505. As the second water flow sensor 82 is maintained in its on-position, the computer determines a "Yes" answer at step 505 and repeats the processing at step 510, 515, 520, 525 and 595. When the first off-timer TD1 becomes more than the first standard off-time TOF1 during execution of the processing, the computer determines a "Yes" answer at step 450 and resets the flag F1 to "0" at step 455. With foregoing processing, the flag F1 is reset to "0" when the first water flow sensor is maintained in its off-position for more than the first standard off-time TOF1.

When the faucets 43, 44 are erroneously closed by a user immediately after they were opened or in the occurrence of water hammer, the first water flow sensor 81 is turned off immediately after it is turned on in a condition where the flag F1 is maintained as "0". In such an instance, the first water flow sensor is turned on in a moment. Thus, the computer determines a "Yes" answer at step 405 and causes the program to step 410, 415 and 420. As the first on-timer TU1 is still less than the first standard on-time TON 1, the computer causes the program to proceed to step 505. When the first water flow sensor is retained in its on-position for a short time, the first on-timer TU1 is increased by the processing at step 415. However, the first water flow sensor is turned off before the computer determine a "Yes" answer at step 420. When the first water flow sensor is turned off, the computer determines a "No" answer at step 405 and causes the program to proceed to step 440–450 (455). As a result, the flag F1 is maintained as "0".

When the faucets 43, 44 are fully closed and opened after they were operated by the user to throttle the discharge amount of electrolyzed water, the first water flow sensor is turned off and on in a condition where the flag F1 is maintained as "1". In such an instance, the first water flow sensor is turned off in a moment. Thus, the computer determines a "No" answer at step 405 and causes the program to proceed to 440, 445 and 450. As the first off-timer is still less than the first standard off-time TOF 1, the computer causes the program to proceed to step 505. While the first water flow sensor is maintained in its off-position in a short time, the processing at step 445 is repeated by the computer to increase the first off-timer. However, the first water flow sensor is turned on before the computer determines a "Yes" answer at step 450. As a result, the computer determines a "Yes" answer at step 405 and causes the program to proceed to step 410–420 (425). Thus the flag F1 is maintained as "1".

The flag F2 is controlled in the same manner as in the flag F1. That is to say, the flag F2 is changed from "0" to "1"(by processing at step 505, 510–525) while the second water flow sensor is maintained in its on-position for more than the second standard on-time TON2, and the flag F2 is changed from "1" to "0" (by processing at step 505, 540–555) when the second water flow sensor is maintained in its off-position for more than the second standard off-time TOF2.

Such control of the flags F1 and F2 is used for control of production of electrolyzed water as will be described hereinafter. In this embodiment, the first and second standard on-times TON 1 and TON2 are determined to be more than a period of time during which the water flow sensors are maintained in their on-positions for a moment due to water hammer or an error in operation of the user. Similarly, the first and second off-times TOF1 and TOF2 are determined to be more than a period of time during which the water flow sensors are maintained in their off-positions in a moment due to an error in operation of the user. In addition, the first and second standard on-times TON1 and TON2 are determined to be equal to each other, and the first and second standard off-times TOF 1 and TOF2 are also determined to be equal to each other.

(2)Discharge of Electrolyzed Water:

(2- 1) When either the faucet 43 or 44 and either the faucet 45 or 46 are opened by the user to discharge both the alkaline water and acid water after the main cock 26 was opened, the first and second water flow sensors 81, 82 are turned on by the flow of water supplied into the electrolyzer 10. On the other hand, the main switch 101 of the control device 100 is turned on by the user. In such instance, the computer initializes the program and resets the flags F1, F2 to "0". Subsequently, the computer starts t execute a program shown by a, flow chart in FIG. 2 at step 200 and determines at step 205 whether the flags F1 and F2 each are "1" or not. As the water flow sensors 81 and 82 are maintained in the on-positions until lapse of the first or second standard on-time TON1 or TON2, the figs F1 and F2 each are maintained as "0". Thus the computer determines a "No" answer at step 205 and repeats the processing at step 205 until either the flag F1 or F2 becomes "1".

Figure 2:
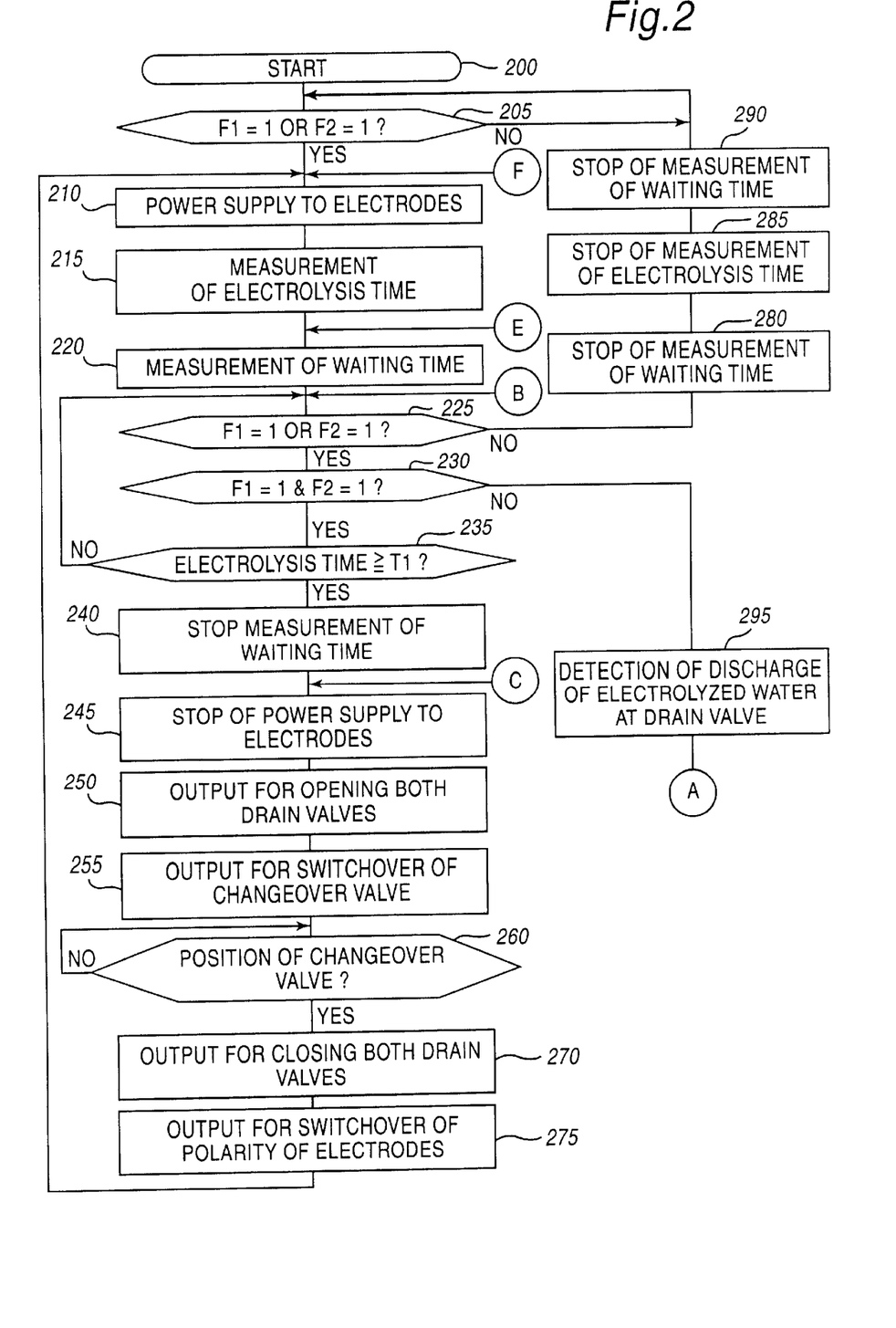
FIG. 2 is a flow chart showing a first part of a program executed by a microcomputer of an electric control device illustrated in FIG. 1.

When the flag F1 or F2 becomes "1" after lapse of a time, the computer determines a "Yes" answer at step 205 and causes the program to proceed to step 210. Thus, the computer applies DC voltages to the electrodes 14, 15 in a forward direction at step 210 to start electrolysis of the supplied water and starts measurement of an electrolysis time and a waiting time respectively at step 215 and 220.

When the program proceeds to step 225, the computer determines whether either the flag F1 or F2 is "1" or not. As the faucets 43, 44; 45, 46 are maintained without any change, the computer determines a "Yes" answer at step 225 and determines at step 230 whether both the flags F1 and F2 are maintained as "1" or not. At this stage, both the flags F1 and F2 are maintained as "1". Thus, the computer determines a "Yes" answer at step 230 and causes the program to proceed to step 235. At step 235, the computer determines whether the electrolysis time is more than a predetermined time T1 or not. In this embodiment, the predetermined time T1 is defined to represent a period of time (about 10 minutes) during which the electrolysis performance of electrolyzer 10 tends to decrease due to scal adhered to the electrodes 14, 15. As the electrolysis time at this stage is still less than the predetermined time T1, the computer determines a "No" answer at step 235 and return the program to step 225. Thereafter, the computer repeats processing at step 225, 230 and 235 until the electrolysis time becomes more than the predetermined time T1 so that the alkaline water and acid water are discharged through the faucets 43, 44 and 45, 46, respectively.

When the electrolysis time becomes more than the predetermined time T1, the computer determines a "Yes" answer at step 235 and causes the program to proceed to step 240. Then, the computer stops temporarily the measurement of the waiting time at step 240 and executes processing at step 245 to 275 for switching over the position of the changeover valve 50 and the supply direction of DC voltages to the electrodes 14, 15 thereby to prevent a decrease of the electrolysis performance caused by scale adhered to the electrodes 14, 15.

In the processing at step 245 to 275, the computer stops temporarily the supply of DC voltages to the electrodes 14, 15 at step 245, outputs at step 250 an open signal for opening the drain valves 71, 72 and outputs at step 255 a signal for switching over the changeover valve 50 from its first position to its second position or vice versa. Subsequently, the computer determines at step 260 whether the changeover valve 50 has been switched over or not. If the answer is "Yes", the program proceeds to step 270 where the computer outputs a close signal for closing both the drain valves 71, 72 and causes the program to proceed to step 275. As step 275, the computer inverts the supply direction of DC voltages to the electrodes 14, 15 and returns the program to step 210 to repeat the foregoing processing.

Figure 5:
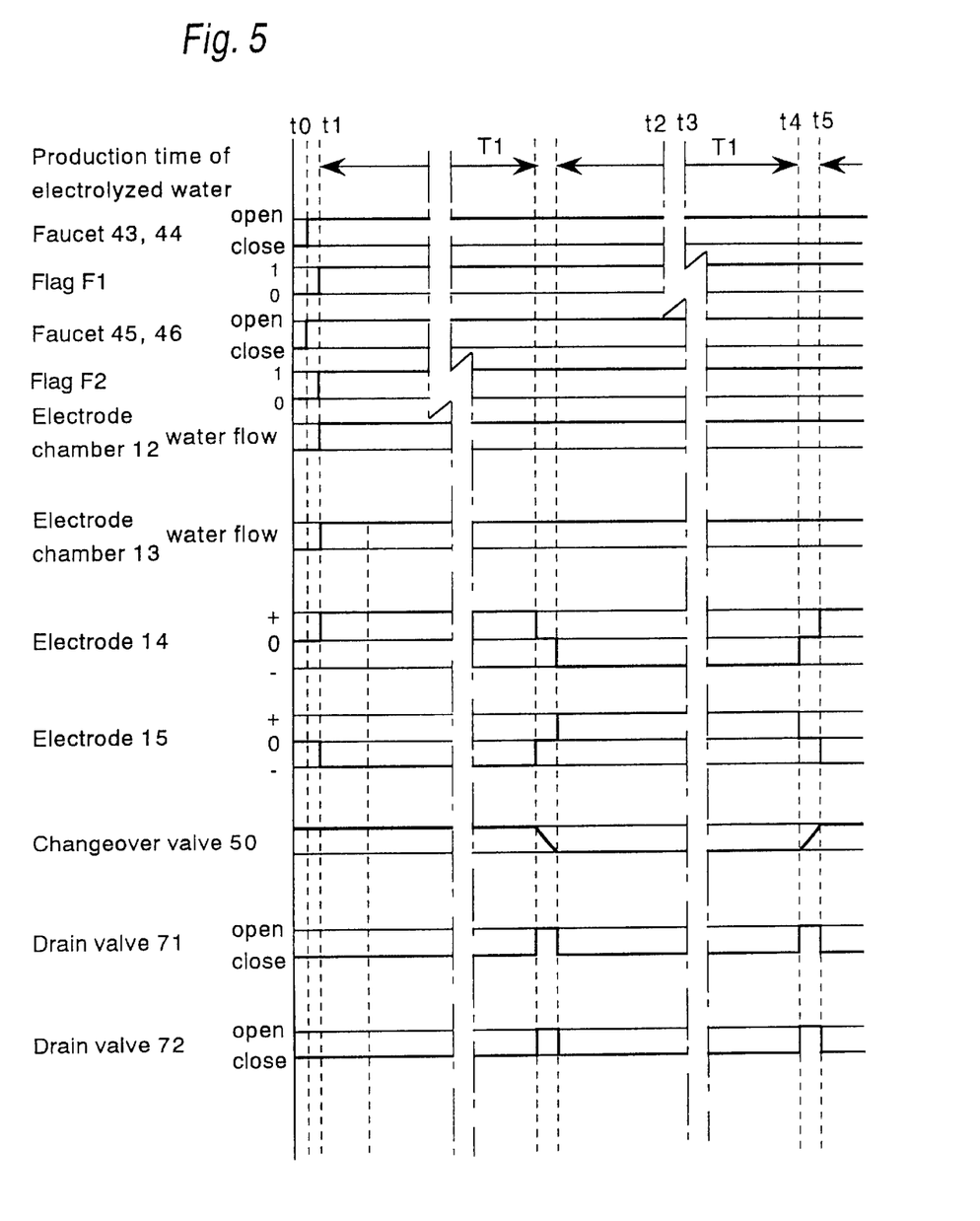
FIG. 5 is a time chart showing an operation mode of the production system of electrolyzed water shown in FIG. 1.

The foregoing operation is illustrated by a time chart in FIG. 5. This is to say, the electrodes 14, 15 are applied with positive and negative DC voltages when the faucets 43, 44 and 45, 46 opened at a time t0, and the flags F1 and F2 are changed to "1" from "0" at a time after lapse of the first and second standard on-times TON1 and TON2. In this instance, the DC voltages are applied to the electrodes 14, 15 (in a forward direction) so that the electrodes 14, 15 act as an anode and a cathode, respectively. Upon lapse of the predetermined time T1, the computer stops the supply of DC voltages to the electrodes 14, 15 at a time t2, activates the electric motor (not shown) to switch over the changeover valve 50 and maintains both the drain valves 71, 72 in their open positions for a period of time during which the changeover valve 50 is switched over at a time t3. When the changeover valve 50 is switched over at the time t3, the electrodes 14, 15 are applied with negative and positive DC voltages (in a reverse direction) under control of the computer. Thus, the electrodes 14, 15 act as a cathode and an anode to effect electrolysis of the supplied water. When the predetermined time T1 further lapses from the time t3, the same operation as that at the time t2 is effected at a time t4. In such an instance, the position of the changeover valve 50 is switched over, and the supply direction of DC voltages to the electrodes 14, 15 is switched over to the forward direction to restart electrolysis of the supplied water at a time t5. Thus, the alkaline water and acid water are discharged through the discharge conduits 41 and 42 except for the period during which the changeover valve 50 is switched over.

Assuming that all the faucets 43, 44 and 45, 46 have been closed after the faucet 43 or 44 and 45 or 46 were opened, the water flow sensors 81, 82 are turned off. As a result, the flags F1, F2 are changed to "0" upon lapse of the first or second standard off-time TOF1 or TOF2. In such an instance, the computer determines a "No" answer at step 225 and stops at step 280 the supply of DC voltages to the electrodes 14, 15. Subsequently, the computer stops the measurement of the electrolysis time at step 285 and stops the measurement of the waiting time at step 290. Thereafter, the computer returns the program to step 205 to monitor whether either the flag F1 or F2 is changed to "1" or not. With the foregoing operation, the production system of electrolyzed water A is deactivated to stop electrolysis of the supplied water and to 9p discharge of the electrolyzed water.

Figure 6:
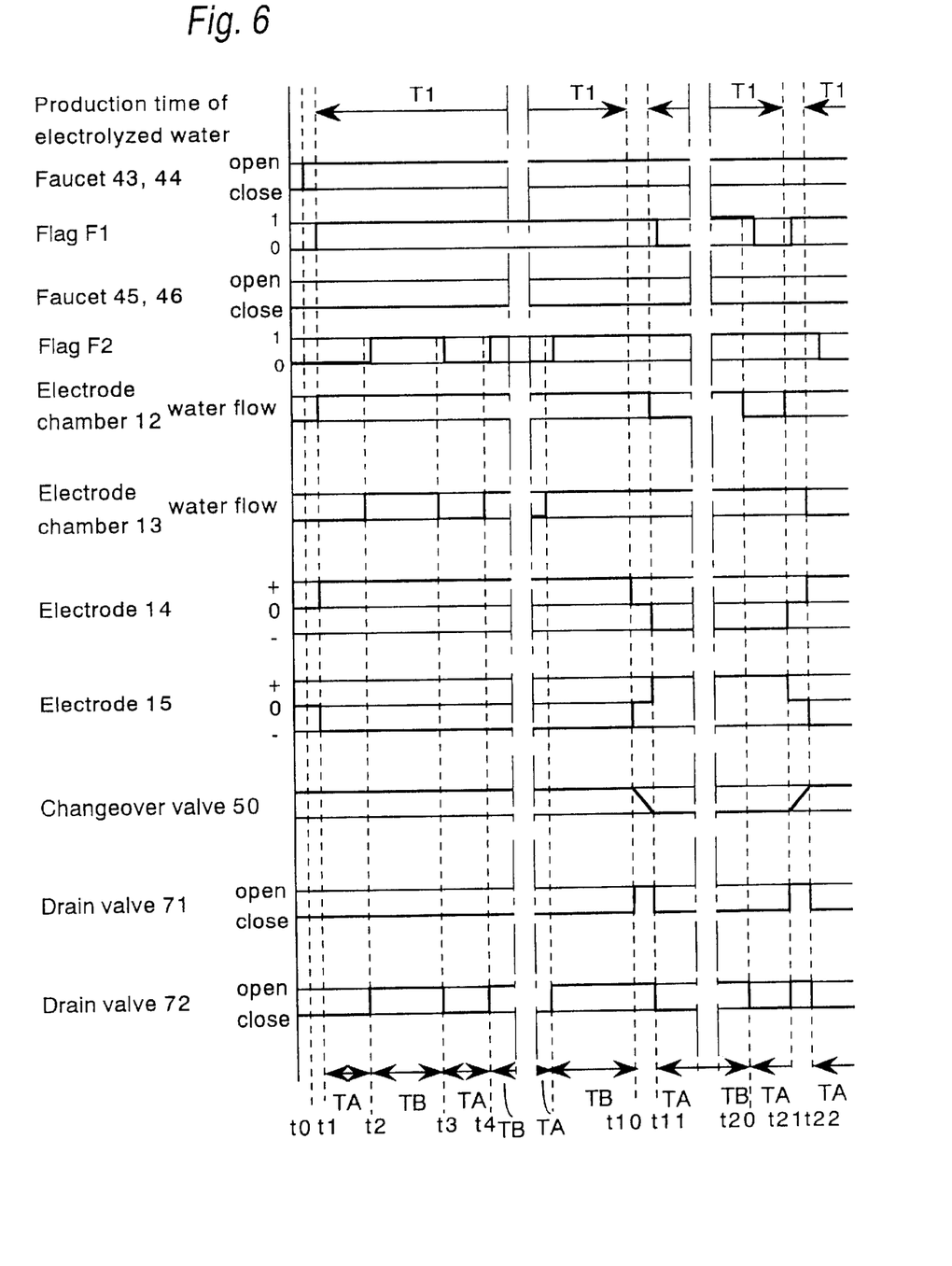
FIG. 6 is a time chart showing another operation mode of the production system of electrolyzed water.

(2-2) Operation of the production system of electrolyzed water in a condition where only one of the faucets of is opened:

Assuming that either one of the faucets 43, 44 or both the faucets 43, 44 has been opened by the user to discharge only the acid water in a condition where the changeover valve 50 is retained in its first position as shown in FIG. 1, the water flow sensor 81 is turned on. After the sensor 81 was turned on, the flag F1 is changed to "1" upon lapse of the first standard on-time TON1. Thus, the computer determines a "Yes" answer at step 205 of FIG. 2 and executes processing at step 210, 215, 220 and 225 as in the same manner described above for applying the DC voltages to the electrodes 14, 15 and for measuring the electrolysis time and waiting time. (see a time t1 shown in FIG. 6) Thereafter, the computer causes the program to proceed to step 230 for determining whether both the flags F1, F2 are "1" or not.

At this stage, the faucets 43, 44 are opened, the faucets 45, 46 are retained in their closed positions, and the drain valves 71, 72 are retained in their closed positions. Thus, the water flow sensor 81 is turned on, while the water flow sensor 82 is turned off. As a result, the flag F1 is changed to "1", while the flag F2 is maintained as "0". In this instance, the computer determines a "No" answer at step 230 and causes the program to proceed to step 295. At step 295, the computer determines the flags F1 and F2 as the water flow sensors 81 and 82 respectively to discriminate the drain valve 71 on the drain conduit 61 bifurcated from the discharged conduit 41 opened at its faucets 43, 44 and the drain valve 72 on the drain conduit 62 bifurcated from the discharge conduit 42 closed at its faucets 45, 46.

Figure 3:
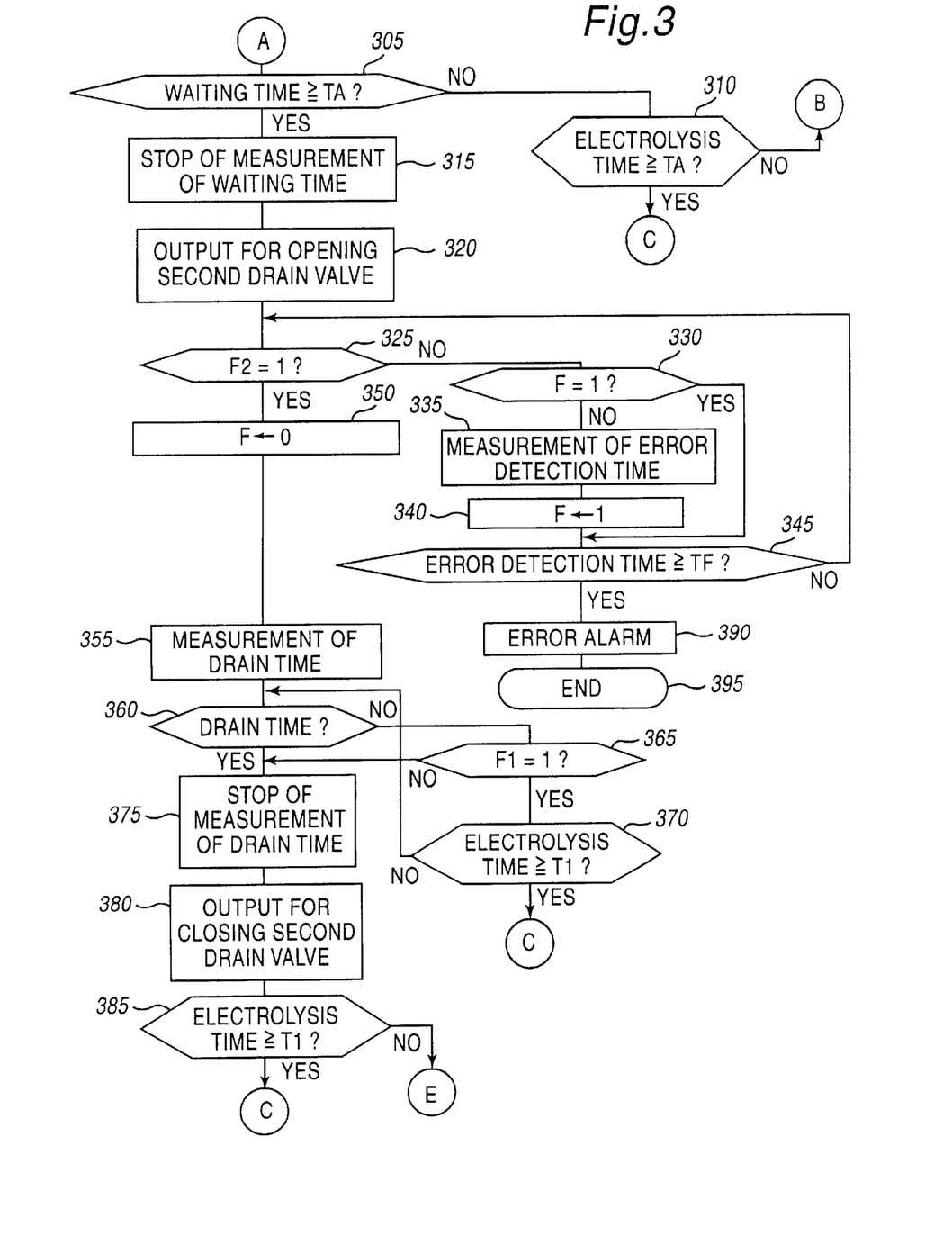
FIG. 3 is a flow chart showing a second part of the program.

Subsequently, the computer causes the program to proceed to step 305 shown in FIG. 3 and determines at step 305 whether the waiting time is more than a standard waiting time TA or not. As the measurement of the waiting time has been just started at step 220, the computer determines a "No" answer a step 305 and determines at step 310 whether the electrolysis time becomes more than the predetermined time T1 or not. As the electrolysis of water has been just started, the computer determines a "No" answer at step 310 and returns the program to step 225. Thereafter, the computer repeats processing at step 225, 230, 295, 305 and 310 until a "Yes" answer is determined at step 310. Thus, the drain valves 71, 72 are maintained in their closed positions to discharge only the acid water through the drain conduit 41.

During such operation of the production system of electrolyzed water, electrolysis of the supplied water is effected only in one of the electrode chambers in a condition where either the faucets 43, 44 or 45, 46 are opened while the other faucets are maintained in their closed positions and where both the drain valves 71, 72 are closed. As a result, an amount of gas is generated and bubbled due to the water retained in one of the electrode chambers during electrolysis of the water in the other electrode chamber, and the pH of electrolyzed water in the electrode chamber becomes excessive or too small. Accordingly, in the foregoing process, the standard waiting time TA is determined (for example, in about 10 seconds) taking into account a period of time during which the gas is generated and bubbled in the electrode chamber. In addition, the standard waiting time TA is determined to be shorter than the predetermined time T1 during which the electrolysis performance is decreased due to scale adhered to the electrodes.

Since the standard waiting time TA is determined as described above, the computer normally determines a "Yes" answer at step 305 prior to determine a "Yes" answer at step 310 and causes the program to proceed to step 315. Thus, the computer stops the measurement of the waiting time at step 315 and outputs at step 320 an open signal for opening the drain valve 72 at a time t2 shown in FIG. 6. With such processing at step 320, the drain valve 72 is opened to discharge the water retained in the electrode chamber 13 through the drain conduit 62, and the water retained in the electrode chamber 13 is diluted by fresh water supplied from the inlet conduit 22.

When the program proceeds to step 325, the computer determines whether the flag F2 is "1" or not. As the second water flow sensor 82 is still maintained in its off-position at a time immediately after the drain valve 72 was opened, the flag F2 is maintained as "0". Thus, the computer determines a "No" answer at step 325 and determines at step 330 whether a flag F for error detection is "1" or not. As the flag F is set as "0" at initialization of the program when the production system was activated, the computer determines a "No" answer at step 330 and causes the program to proceed to step 335 for measuring a detection time of an error in the production system. When the program proceeds to step 340, the computer the flag F to "1" and determines at step 345 whether the error detection time has passed more than a standard error detection time TF or not. At a time immediately after start of the measurement of the error detection time, the computer determines a "No" answer at step 345 and returns the program to step 325. Thereafter, the computer repeats processing at step 325 to 345 until a "Yes" answer is determined at step 325 or 345.

In this embodiment, the standard error detection time TF is determined taking into account a period of time during which either the flow sensor 81 or 82 is turned on after the second drain valve was opened and during which the flag F2 is changed to "1" from "0". When the passages between the drain valves 71, 72 and changeover valve 50 each are in a normal condition, the flag F2 is changed to "1" before the error detection time becomes more than the standard error detection time TF. Thus, the computer normally determines a "Yes" answer at step 325 and causes the program to proceed to step 350. Subsequently, the computer resets the flog F to "0" at step 350 and initiates at step 355 to measure a drain time during which the water retained in the electrode chamber 13 is discharged after the drain valve was opened at step 320.

When the program proceeds to step 360, the computer determines whether the drain time has passed more than the standard drain time TB or not. As the drain time is still less than the standard drain time TB at a time immediately after the flag F12 has been changed to "1", the computer determines a "No" answer at step 360 and causes the program to proceed to step 365 for determining whether the first water flow sensor 81 has been turn on or not. The processing at step 365 is executed to determine whether or not only the acid water is still discharged in a condition where the faucets 43, 44 are opened. As the condition of the faucets 43, 44 and 45, 46 are unchanged at this stage, the computer determines a "Yes" answer at step 365 and causes the program to proceed to step 370 for determining whether the electrolysis time becomes more than the predetermined time T1 or not. At this stage immediately after the electrolysis of the water has been started, the computer determines a "No" answer at step 370 and returns the program to step 360. Thereafter, the computer repeats the foregoing processing until a "Yes" answer is determined at step 360, a "No" answer is determined at step 365 or a "Yes" answer is determined at step 370. In this embodiment, the standard drain time TB is determined taking into account a period of time during which the water retained in the electrolyzed 10 is discharged immediately before an amount of gas is generated and bubbled in the electrode chamber and before the pH of the electrolyzed water becomes excessive or too small. For example, the standard drain time TB is determined in 20 seconds to be shorter than the predetermined time T1.

When the drain time becomes more than the standard drain time TB in a condition where the condition of faucets 43, 44 and 45, 46 is unchanged, the computer determines a "Yes" answer at step 360 and causes the program to proceed to step 375. Then, the computer stops the measurement of the drain time at stp 375 and outputs at step 380 a close signal for closing the drain valve 72 at a time t3 shown in FIG. 6. At the following step 385, the computer determines whether the electrolysis time becomes than the predetermined time T1 or not. In a condition where any scale does not adhered to the electrodes, the computer normally determines a "No" answer at step 385 and returns the program to step 220 shown in FIG. 2. Thereafter, if the condition of faucets 43, 44 and 45, 46 is unchanged, the computer starts to measure the waiting time at step 220, outputs at step 320 an open signal for opening the second drain valve 72 upon lapse of the standard waiting time TA and outputs at step 380 a close signal for closing the second drain valve 72 upon lapse of the standard drain time TB.

When the electrolysis time becomes more than the predetermined time T1 in a condition where only the faucets 43, 44 are being opened, the supply direction of DC voltages to the electrodes 14, 15 is switched over as follows. In such an instance, the computer starts at step 215 to measure the electrolysis time and determines at step 310, 370 or 385 whether the electrolysis time becomes more than the predetermined time T1 or not. When a "Yes" answer is determined at step 310, 370 or 385, the computer causes the program to proceed to step 245 and executes processing at step 245–275 to switch over the position of the changeover valve 50 and the supply direction of DC voltages to the electrodes. Thereafter, the computer returns the program to step 210.

Thus, even when the second drain valve 72 is maintained in its closed position during the standard waiting time TA or maintained in its open position during the standard drain time TB in a condition where either one of the faucets 43, 44 or both the faucets 43, 44 is opened or either one the faucets 45, 46 or both the faucets 45, 46 is opened, both the drain valves 71, 72 are opened by the processing at step 250, and simultaneously the changeover valve 50 is switched, over by the processing at step 255 after the supply of DC voltages to the electrodes was stopped by the processing at step 245. Subsequently, the drain valves 71, 72 are closed after the changeover valve 50 was switched over. (see the processing at step 260, 270 and times t10–t11, t21–t22 in FIG. 6.)

Accordingly, when the electrolysis time of the water becomes more than the predetermined time T1 in a condition where either the alkaline water or acid water is discharged while the other water is intermittently discharged, both the drain valves 71, 72 are opened, and the position of changeover valve 50 and the supply direction of DC voltages to the electrodes are switched over to prevent a decrease of the electrolysis performance of the electrodes. Thereafter, the waiting time is measured irrespectively of the condition of drain valves 71, 72 (see processing at step 220 executed after processing at step 310, 370 and 385) When the second drain valve 72 is maintained in its closed position in a condition where only the faucets 43, 44 are maintained in their open positions, the computer repeats the processing at step 225, 230, 295, 305, 310. Thus, when the faucets 43, 44 are closed during such a period of time, the computer determines a "No" answer at step 225 and stops the production of electrolyzed water by processing at step 280, 285 and 290.

On the other hand, when the second drain valve 72 is maintained in its open position in a condition where only the faucets 43, 44 are maintained in their open positions, the computer repeats processing at step 360, 365 and 370. Accordingly, when the faucets 43, 44 are closed during such a period of time, the flag F1 becomes "0". In such an instance, the computer determines a "No" answer at step 365, stops the measurement of the drain time by processing at step 375, and closes the second drain valve 72 by processing at step 380. Subsequently, the computer executes processing at step 385, 220, 225 and determines a "No" answer at step 225. Thus, the computer stops the production of electrolyzed water by processing at step 280, 285 and 290.

In the occurrence of trouble of the drain valve 72 or clog in the discharge conduit 42 and drain conduit 62 in a condition where only the faucets 43, 44 are maintained in their open positions the second water flow sensor 82 may not be turned on after the second drain valve 72 was opened by processing at step 320. Accordingly the computer repeats execution of the processing at step 325 to 345 and determines a "Yes" answer at step 345 when the error detection time measured at step 335 becomes more than the standard error detection time TF. When a "Yes" answer is determined at step 345 the computer causes the program to proceed to step 390 and determines at step 390 whether the first water flow sensor 81 is still maintained in its on-position or not. If at this stage, there occurs trouble in the second drain valve 72 or clog in the discharge conduit 42 and drain conduit 62 in a normal supply condition of the water, the second water flow sensor 82 may not be turned on while the first water flow sensor 81 is turned on. Accordingly, the computer determines a "Yes" answer at step 390 and activates the alarm buzzer 104 at step 395 to inform the user of an abnormal condition. Although the above description was made to explain detection of an error in a condition where only the faucets 43, 44 have been closed, the same operation as in the above condition is effected in a condition where only the faucets 45, 46 have been closed.

In the embodiment.described above, even when the water flow sensors 81, 82 were turned on from their off-positions, the supply of DC voltages to the electrodes is delayed with the first and second standard on-times TON1, TON2 under control of the flags F1, F2 at step 205. Similarly, even when the water flow sensors 81, 82 were turned off from their on-positions, the supply of DC voltages to the electrodes is cut off after lapse of the first and second off-times TOF1, TOF2 under control of the flags F1, F2 at step 225. Accordingly, even if the faucets 43, 44 and 45, 46 are erroneously operated, the supply of DC voltages to the electrodes for a short time or the cut-off of DC voltages to the electrodes for a short time can be avoided to prevent shortening of the electrodes.

What is claimed is:

1. A production system of electrolyzed water including an electrolyzer provided therein with a pair of electrodes, water supply means for supplying water to be treated into the electrolyzer, and detection means for detecting the flow of water supplied into the electrolyzer, where in the electrodes of the electrolyzer are applied with DC voltages to electrolyze the water when the flow of water is detected by the detection means, wherein the production system of electrolyzer comprises control means for applying the DC voltages to the electrodes of the electrolyzer only when the flow of water is continuously detected by the detection means for more than a predetermined time.

2. A production system of electrolyzed water including an electrolyzer provided therein with a pair of electrodes, a water supply conduit connected to the electrolyzer for continuously supplying water to be treated into the electrolyzer from an external water supply source, a discharge conduit connected to the electrolyzer for discharging electrolyzed water produced in the electrolyzer to the exterior, and a manually operated valve provided on the water supply conduit or the discharge conduit for adjusting an amount of the water flowing from the water supply conduit into the discharge conduit through the electrolyzer, detection means for detecting the flow of water, and control means for applying DC voltages to the electrodes of the electrolyzer, wherein the electrodes of the electroyzer are applied with the DC voltages for electrolysis of the water under control of the control means when the flow of water is detected by the detection means, wherein the control means comprises means for applying the DC voltages to the electrodes of the electrolyzer only when the flow of water is continuously detected by the detection means for more than a predetermined time.

3. A production system of electrolyzed water including an electrolyzer provided therein with a pair of electrodes, water supply means for supplying water to be treated into the electrolyzer, and detection means for detecting the flow of water supplied into the electrolyzer, wherein the electrodes of the electrolyzer are applied with DC voltages to electrolyze the water when the flow of water is detected by the detection means, wherein the production system of electrolyzed water comprises control means for cutting off the supply of DC voltages to the electrodes of the electrolyzer when the flow of water is not continuously detected by the detection means for more than a predetermined time.

4. A production system of electrolyzed water including an electrolyzer provided therein with a pair of electrodes, a water supply conduit connected to the electrolyzer for continuously supplying water to be treated into the electrolyzer from an external water supply source, a discharge conduit connected to the electrolyzer for discharging electrolyzed water produced in the electrolyzer to the exterior, and a manually operated valve provided on the water supply conduit or the discharge conduit for adjusting an amount of the water flowing from the water supply conduit into the discharge conduit through the electrolyzer, detection means for detecting the flow of water, and control means for applying DC voltages to the electrodes of the electrolyzer, wherein the electrodes of the electroyzer are applied with the DC voltages for electrolysis of the water under control of the control means when the flow of water is detected by the detection means, wherein the production system of electrolyzed water comprises means for cutting off the supply of DC voltages to the electrodes of the electrolyzer when the flow of water is not continuously detected by the detection means for more than a predetermined time.

* * * * *